(12) United States Patent
Mathias et al.

(10) Patent No.: US 7,303,835 B2
(45) Date of Patent: Dec. 4, 2007

(54) DIFFUSION MEDIA, FUEL CELLS, AND FUEL CELL POWERED SYSTEMS

(75) Inventors: Mark F. Mathias, Pittsford, NY (US); Joerg Roth, Trebur (DE); Bhaskar Sompalli, Rochester, NY (US); Michael Schoeneweiss, W. Henrietta, NY (US); David Wood, Santa Fe, NM (US)

(73) Assignee: General Motors Corporation, Detroit, MI (US)

( * ) Notice: Subject to any disclaimer, the term of this patent is extended or adjusted under 35 U.S.C. 154(b) by 628 days.

(21) Appl. No.: 10/685,346

(22) Filed: Oct. 14, 2003

(65) Prior Publication Data

US 2004/0137311 A1    Jul. 15, 2004

Related U.S. Application Data

(63) Continuation-in-part of application No. 10/345,121, filed on Jan. 5, 2003, now abandoned.

(51) Int. Cl.
*H01M 4/00* (2006.01)
*H01M 8/10* (2006.01)
*H01M 2/14* (2006.01)

(52) U.S. Cl. .............................. 429/44; 429/30; 429/38

(58) Field of Classification Search .................. 429/44, 429/42, 30, 38
See application file for complete search history.

(56) References Cited

U.S. PATENT DOCUMENTS

| | | | |
|---|---|---|---|
| 5,350,643 A | 9/1994 | Imahashi et al. | |
| 5,952,119 A | 9/1999 | Wilson | |
| 5,998,058 A | 12/1999 | Fredley | |
| 6,024,848 A * | 2/2000 | Dufner et al. | 204/252 |
| 6,127,059 A | 10/2000 | Kato | |
| 6,194,094 B1 | 2/2001 | Sugawara et al. | |
| 6,280,870 B1 | 8/2001 | Eisman et al. | |

(Continued)

FOREIGN PATENT DOCUMENTS

EP    0 846 347 B1    6/1998

(Continued)

OTHER PUBLICATIONS

"Contact angles from Wikipedia" http://en.wikipedia.org/wiki/Contact_angle.*

*Primary Examiner*—Gregg Cantelmo
*Assistant Examiner*—Eugenia Wang
(74) *Attorney, Agent, or Firm*—Dinsmore & Shohl LLP

(57) ABSTRACT

A porous diffusion media according to the present invention is positioned against a catalyst layer of the membrane electrode assembly, the porous matrix comprises carbon paper, and the water transfer particles comprise carbon fibers or powders. Relatively high and relatively low water transfer particle density regions alternate across the porous diffusion media. A first major face of the media may be collectively more hydrophilic than the second major face and the second major face may be collectively more hydrophobic than the first major face. The diffusion media is positioned against the catalyst layer along the first major face of the diffusion media and against a flow field of the fuel cell along the second major face of the diffusion media. The porous diffusion media comprises hydrophobic material disposed along the second major face of the diffusion media.

42 Claims, 3 Drawing Sheets

| U.S. PATENT DOCUMENTS | | | | FOREIGN PATENT DOCUMENTS | | |
|---|---|---|---|---|---|---|
| 6,280,872 B1 | 8/2001 | Ozaki et al. | | EP | 0 872 907 A | 10/1998 |
| 6,303,245 B1 | 10/2001 | Nelson | | EP | 872907 A1 * | 10/1998 |
| 6,350,539 B1 * | 2/2002 | Wood et al. | 429/34 | WO | WO 01/04980 * | 1/2001 |
| 6,365,293 B1 | 4/2002 | Isono et al. | | WO | WO 01/04980 A | 1/2001 |
| 6,368,476 B1 | 4/2002 | DeMarinis et al. | | | | |
| 2002/0051901 A1 | 5/2002 | Zuber et al. | | * cited by examiner | | |

DIFFUSION MEDIA, FUEL CELLS, AND FUEL CELL POWERED SYSTEMS

CROSS-REFERENCE TO RELATED APPLICATIONS

The present application is a continuation-in-part of abandoned U.S. patent application Ser. No. 10/345,121 (GP-302361), filed Jan. 5, 2003. This application is also related to U.S. patent application Ser. No. 10/628,318 (GMC 0047 PA), Ser. No. 10/628,316 (GMC 0048 PA), and Ser. No. 10/628,856, which issued as U.S. Pat. No. 6,967,039 (GMC 0051 PA), filed Jul. 28, 2003.

BACKGROUND OF THE INVENTION

The present invention relates generally to diffusion media, fuel cells employing diffusion media according to the present invention, and fuel cell powered systems utilizing such fuel cells. More specifically, the present invention is related to the use of diffusion media in addressing water transport difficulties under wet operating conditions in fuel cells and other types of devices.

BRIEF SUMMARY OF THE INVENTION

A porous diffusion media is provided comprising a porous matrix carrying a distribution of water transfer particles configured to address water transport difficulties under wet operating conditions.

In accordance with one embodiment of the present invention, a porous diffusion media is provided comprising a porous matrix carrying a distribution of water transfer particles. The distribution of water transfer particles defines a plurality of high particle density regions characterized by a relatively high density of the water transfer particles and a plurality of low particle density regions characterized by a relatively low density of the water transfer particles. The relatively high and relatively low particle density regions alternate across a major planar dimension of the porous diffusion media, e.g., the face of the diffusion media may include a checkerboard pattern of high and low particle density regions or any other arrangement of regions where high and low density regions lie adjacent to each other in alternating succession.

In accordance with another embodiment of the present invention, a device is provided where a porous diffusion media according to the present invention is positioned against a catalyst layer.

In accordance with yet another embodiment of the present invention, a device is provided comprising a membrane electrode assembly interposed between an anode flow field and a cathode flow field of a fuel cell. A porous diffusion media according to the present invention is positioned against a catalyst layer of the membrane electrode assembly.

In accordance with yet another embodiment of the present invention, a porous diffusion media according to the present invention is positioned against a catalyst layer of the membrane electrode assembly, the porous matrix comprises carbon paper, and the water transfer particles comprise carbon fibers or powders. Relatively high and relatively low water transfer particle density regions alternate across a major planar dimension of the porous diffusion media. Respective properties of the relatively high and relatively low particle density regions vary across a cross section of the porous diffusion media between the first and second major faces of the diffusion media such that the first major face is collectively more hydrophilic than the second major face and the second major face is collectively more hydrophobic than the first major face. The diffusion media is positioned against the catalyst layer along the first major face of the diffusion media and against a flow field of the fuel cell along the second major face of the diffusion media. The porous diffusion media comprises hydrophobic material disposed along the second major face of the diffusion media.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
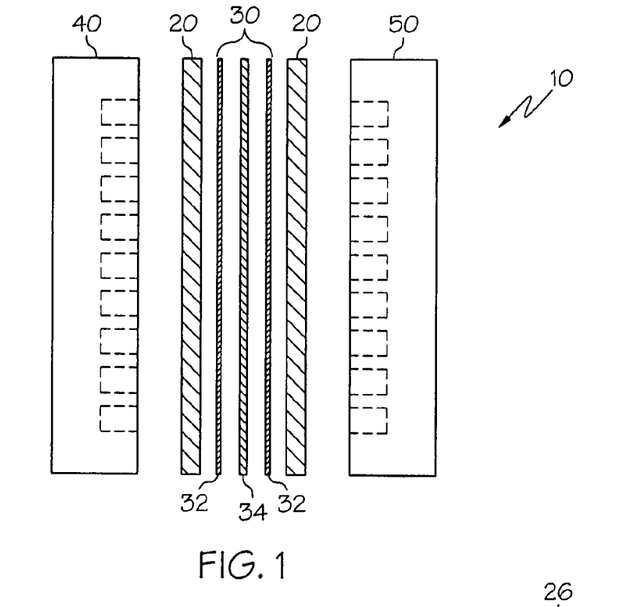
FIG. 1 is an exploded schematic illustration of a fuel cell incorporating a porous diffusion media according to the present invention.

Referring initially to FIG. 1 a fuel cell 10 incorporating a porous diffusion media 20 according to the present invention is illustrated. Specifically, the fuel cell 10 comprises a membrane electrode assembly 30 interposed between an anode flow field 40 and a cathode flow field 50 of the fuel cell 10. It is contemplated that the flow fields 40, 50 and the membrane electrode assembly 30 may take a variety of conventional or yet to be developed forms without departing from the scope of the present invention. Although the particular form of the membrane electrode assembly 30 is beyond the scope of the present invention, in the illustrated embodiment, the membrane electrode assembly 30 includes respective catalytic electrode layers 32 and an ion exchange membrane 34.

Figure 2:
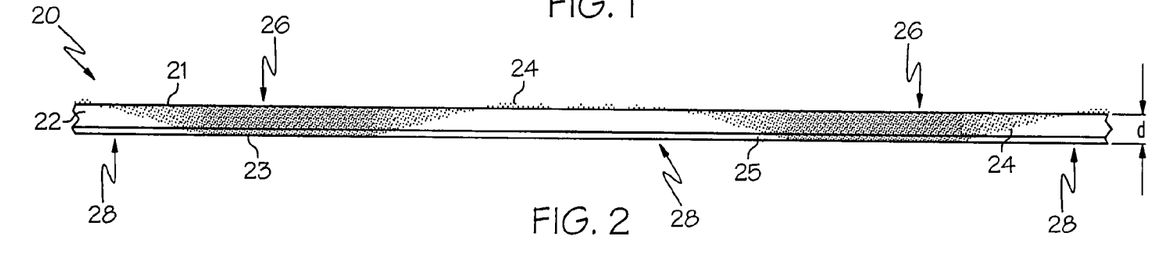
FIG. 2 is an illustration of a suitable distribution of water transfer particles in a portion of a diffusion media according to one embodiment of the present invention.

Referring to FIG. 2, a porous diffusion media 20 according to the present invention comprises a porous matrix 22 carrying a distribution of water transfer particles 24. The distribution of water transfer particles defines a plurality of high particle density regions 26 characterized by a relatively high density of water transfer particles 24 and a plurality of low particle density regions 28 characterized by a relatively low density of water transfer particles 24. The relatively high and relatively low particle density regions 26, 28 alternate across a major planar dimension of the porous diffusion media parallel to first and second major faces 21, 23 of the diffusion media 20.

As is described in further detail below, the water transfer particles 24 may be generated and distributed throughout the matrix 22 in a number of ways. For example, according to one embodiment of the present invention the particles 24 are generated by grinding the first major face 21 of the diffusion media 20 to create a dust and drawing the dust through the matrix 22 with a vacuum draw. The vacuum draw may be configured to create the alternating relatively high and relatively low particle density regions 26, 28. The dust may be bound or unbound. Suitable binders e.g., fluoropolymers, would be configured to at least partially secure the water transfer particles to the porous matrix.

Suitable water transfer particles 24 include any material that will encourage transfer of water from one side of the diffusion media 20 to the other. For example, suitable water transfer particles 24 include, but are not limited to, carbon (e.g., carbon fibers or powders), graphite (e.g., graphite fibers or powders), non-perfluorinated polymers, metal oxides, and combinations thereof. A suitable non-perfluorinated polymer is polyvinylidine fluoride (PVDF). A suitable metal oxide is silicon dioxide. Of course, where the water transfer particles 24 are generated from the material forming the porous matrix 22 and the porous matrix 22 comprises carbon paper, and the water transfer particles 24 will comprise carbon fibers, powders, or a combination of the two. Where the porous matrix comprises carbon paper coated with layers of hydrophobic material, e.g., PTFE, the water transfer particles may be derived from the carbon paper and the hydrophobic layers. In this light, it is noted that water transfer particles 24 may be derived from materials that are hydrophobic in one physical form but may operate as a hydrophilic water transfer particle in another physical state.

The porous matrix 22 may comprise an electrically conductive material, carbon paper, graphite paper, cloth, felt, foam, carbon or graphite wovens, carbon or graphite nonwovens, metallic screens or foams, and combinations thereof. Although the dimensions of the matrix 22 will depend largely upon the design requirements associated with the particular application in which the porous diffusion media 20 is to be utilized it is noted that thicknesses of between about 20 μm and about 1000 μm or, more particularly, about 200 μm, are likely to find utility. Similarly, by way of illustration and not limitation, the porous matrix may define a porosity characterized by a permeometer number (as measured with a Gurley Permeometer, model no. 4301) of about 50 ft$^3$/min./ft$^2$ at about 0.5 inches of water or, more generally, a Gurley permeometer number of between about 20 ft$^3$/min./ft$^2$ and about 100 ft$^3$/min./ft$^2$ at about 0.5 inches of water. In this context, it is noted that porosity is the measure of how easily air can pass through a sample of material. The Gurley test measures the time needed to pass a given volume of air through the sample.

It is noted that the water transfer particles 24 may be selected such that they are sufficiently small enough to permit migration of the particles 24 through a thickness dimension d of the porous matrix 22. In this manner, the particles 24 may be distributed throughout the diffusion media 20 by placing the media 20 and particles 24 carried by the media 20 under a vacuum draw, as described in further detail below. Further, there may be operational benefits associated with migrational freedom of the water transfer particles 24 within the matrix 22. For example, where the diffusion media 20 is positioned against a catalytic electrode layer of a fuel cell to address the water transfer demands at the catalyst layer, the migrational freedom of the particles 24 will permit transfer of some of the particles to the surface of the catalyst layer. Where the dimensions of the particles 24 are defined herein with reference to their ability to migrate within the matrix 22 of the diffusion media 20, it should be understood that such reference is taken independent of whether a binder is present in the diffusion media to bind the particles within the matrix. Stated differently, where particle dimensions are defined by referring to the migratory characteristics of the particles in the diffusion media 20, it should be understood that the migratory characteristics are taken as if no binder were present in the diffusion media 20.

Figure 4:
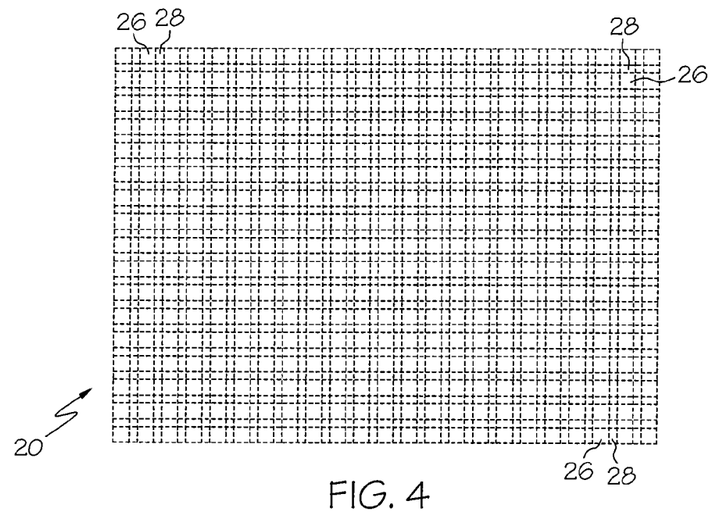
FIG. 4 is a schematic representation of a suitable distribution of high and low particle density regions across the face of a diffusion media according to one embodiment of the present invention.

Referring to FIG. 2, the water transfer particles 24 are distributed across a cross section of the porous diffusion media 20 between the first and second major faces 21, 23 of the diffusion media and alternate across the first and second major faces 21, 23. For illustrative purposes, and not by way of limitation, it is noted that according to one embodiment of the present invention, as shown in FIG. 4, the alternating high and low density regions 26, 28 are characterized by a periodicity of about 0.5 cm. Of course, the periodicity and relative sizes of the high and low density regions 26, 28 depend largely upon the design requirements associated with the particular application in which the porous diffusion media 20 is to be utilized.

The present inventors have recognized advantages in ensuring that water transfer on the anode and cathode sides of the fuel cell is complemented by gas transfer across the diffusion media 20. The alternating configuration of the high and low density regions 26, 28 of the present invention, as is illustrated in FIGS. 2 and 4, limits the interference between water and gas transfer by providing for division of the diffusion media 20 into regions 26 where water transfer is emphasized and regions 28 where gas transfer is emphasized.

As is illustrated in FIG. 2, certain applications may benefit from a configuration where the respective cross-sectional dimensions of the relatively high and relatively low particle density regions 26, 28 vary inversely across the cross section of the porous diffusion media 20 between the first and second major faces 21, 23 of the diffusion media 20. For example, a diffusion media may be created where one of the major faces 21 is dominated by the relatively high particle density regions 26 while the other of the major faces 23 is dominated by the relatively low particle density regions 28. As a result, the first major face will be collectively more hydrophilic than the second major face and the second major face will be collectively more hydrophobic than the first major face. As will be explained in further detail below with reference to FIG. 3, these differing properties may be helpful in the context of a fuel cell.

The present inventors have recognized that water transfer demands at the catalyst layers of a fuel cell should be addressed to avoid problems associated with catalyst flooding. Specifically, water is produced in cathode layers and may back diffuse from the cathode to the anode leading to flooding at the cathode and/or anode sides of a fuel cell. As is illustrated in FIG. 3, the first major face 21, which is dominated by the relatively high particle density regions 26, is positioned against the catalytic electrode layer 32 to address the water transfer demands at the catalyst layer 32 of the fuel cell.

The density of the relatively high particle density regions may remain substantially uniform from one high particle density region to the next across one of the first and second major faces of the diffusion media. Alternatively, the density or configuration of the relatively high particle density regions may vary from one high particle density region to the next across one of the first and second major faces of the diffusion media. This variation in density across the face of the diffusion media may be helpful in the context of a fuel cell as it may be preferable to provide a characteristic density value profile that increases from a flow field inlet region of the diffusion media to a flow field outlet region of the flow field because water transfer demands may be more significant near the flow field outlet region, as compared to the flow field inlet region.

In certain embodiments of the present invention, the high particle density regions 26 may be defined as being sufficiently hydrophilic to define an advancing contact angle of between about 135° and about 180° or, more particularly, between about 160° and about 168°, along one of the first and second major surfaces 21, 23 of the diffusion media 20. In terms of receding contact angles, the high particle density regions may be defined as being sufficiently hydrophilic to define a receding contact angle of between about 95° and about 135° or, more particularly, between about 95° and about 105°, along one of the first and second major surfaces 21, 23 of the diffusion media 20.

Figure 3:
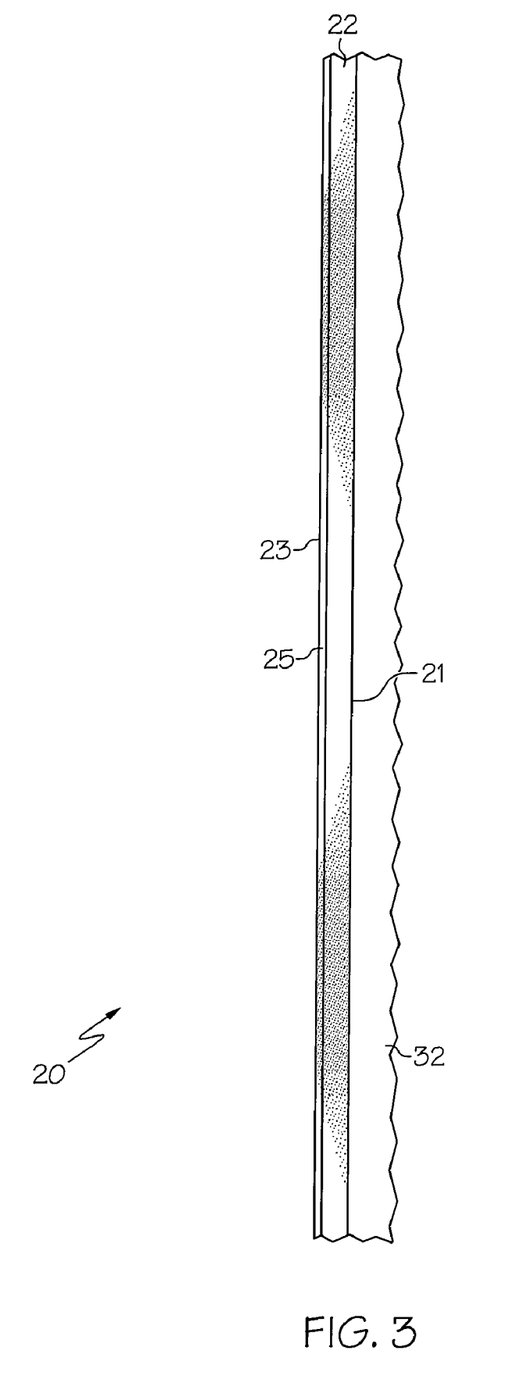
FIG. 3 is an illustration of a diffusion media according to one embodiment of the present invention positioned against a catalyst layer.

As is also illustrated in FIGS. 2 and 3, the porous diffusion media 20 may comprise hydrophobic material 25, e.g., in the form of a hydrophobic layer, disposed along the second major face 23 of the diffusion media 20. The hydrophobic material 25 typically forms a relatively thin layer, e.g., up to about 125 μm in thickness, and may be impregnated in the porous matrix 22 at a loading of up to about 5 mg per $cm^2$ of diffusion media surface area. The hydrophobic material 25 prevents accumulation of liquid water droplets on the second major face 23 of the diffusion media 20. It is contemplated that it may be preferable to ensure that the hydrophobic material 25 is more repellent to water droplets, i.e., more hydrophobic, than both the relatively high and relatively low particle density regions 26, 28 of the porous diffusion media 20.

The hydrophobic material 25 may comprise carbon, graphite, a fluoropolymer, a polymer, and combinations thereof. By way of illustration and not limitation, suitable fluoropolymers may be produced from polytetrafluoroethylene (PTFE), tetrafluoroethylene (TFE), ethylenetetrafluoroethylene (ETFE), fluorinated ethylenepropylene (FEP), a perfluoroalkoxy compound, and combinations thereof, a suitable polymer may be selected from polyphenylene, polyvinylidine fluoride (PVDF), and combinations thereof.

Figure 5:
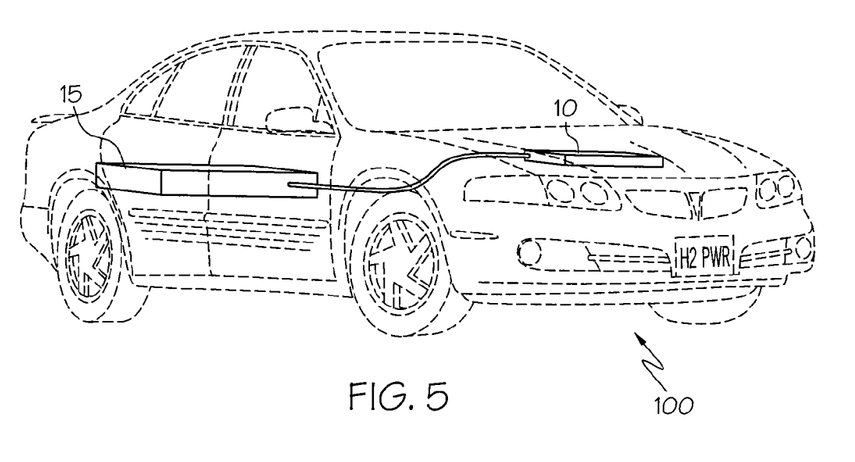
FIG. 5 is an illustration of a vehicle incorporating a fuel cell employing a porous diffusion media according to the present invention.

Referring to FIG. 5, it is noted that devices according to the present invention may include additional structure defining a fuel cell powered motor vehicle 100, in combination with a fuel cell 10 according to the present invention and a fuel storage mechanism 15.

Referring to a suitable method of making a diffusion media according to the present invention, the first step in the method may be to dip the substrate in a relatively hydrophobic substance. A typical substrate is 100 to 400 micron thick carbon fiber paper, for example Toray TGPH-060 produced by Toray (Japan). The solution is typically a dispersion containing a hydrophobic substance, such as polytetrafluororoethylene (PTFE), suspended in a solvent. A typical dispersion is T-30 solution produced by duPont. The substrate is dipped in the dispersion for a time sufficient to achieve nearly complete saturation of the substrate with the material. More specifically, the substrate remains in the solution for about three minutes. The substrate is removed slowly in order to prevent breakage and at a slight angle to allow excess solution to run off the substrate. The paper is then allowed to drip dry for between about 5 to about 10 minutes on a rack. The rack holding the substrate is then placed into an oven to endure a heat cycle.

The heat cycle can be broken down into three stages wherein the temperature of the oven can be increased at 10° C./minute. In the first stage, the heat cycle can increase from about 40° C. to about 96° C. and the temperature can be held for about 45 minutes. In the second stage, the temperature of the heat cycle can increase from 96° C. to about 300° C. and the temperature can be held for about 30 minutes. In the third stage, the temperature of the heat cycle can then be raised from about 300° C. to about 390° C. and the temperature can be held for about 20 minutes in order to sinter the PTFE. The oven is then allowed to cool to 40° C. and the substrate is removed from the oven.

Typically, about 0.1% to about 25% of the mass of the diffusion media, or more specifically, about 7% of the mass of the diffusion media comprises sintered PTFE. After sintering, the PTFE is approximately evenly distributed over the first and second sides of the substrate to form the relatively hydrophobic layers of material. It is to be appreciated that an incidental amount of the relatively hydrophobic material may remain within the bulk of substrate. The relatively hydrophobic layer may comprise a continuous layer or a discontinuous layer.

The second side of the substrate is placed over a vacuum draw. The vacuum draw contains air holes, which suction the substrate and hold the substrate against the vacuum table. The air holes are generally about 1/16" in diameter and spaced about 1/4" apart from one another. The air holes are in rows spaced about 1/4" apart from one another. The rows are typically staggered.

The substrate then endures a grinding step on the first side of the substrate while exposed to the vacuum draw. The grinding creates a dust that the vacuum draw 70 pulls through some regions of the substrate—creating the high and low particle density regions described above. The vacuum draw pump pulls air through the air holes at about 210 cubic feet per minute for a substrate of approximately 1000 $cm^2$ in area.

The substrate endures grinding on the first side wherein between about 10 microns and 500 microns of the substrate is ground away. The final thickness after grinding can be about 185 microns to about 200 microns from a starting material that is approximately 300 microns thick; therefore, typically about 100 microns of the substrate is ground away. In one embodiment of the present invention in which the hydrophobic material (e.g. PTFE) is concentrated most heavily on outside surface of the pre-ground substrate, the vacuum draw operates during the entire grinding process and is left on for a time sufficient to draw most, if not all, of the relatively hydrophobic dust through the substrate to a waste container attached to the vacuum. Thus, the relatively hydrophilic dust originating closer to the first side 21 is the last portion to be drawn through the substrate. When the vacuum is turned off, the dust is allowed to settle in and on the substrate. More specifically, the relatively hydrophilic dust that was pulled through the substrate but not completely to the waste container remains within the pores of the substrate. The remaining relatively hydrophilic dust that had not yet reached the pores of the substrate may settle over the first side of the substrate, thereby forming a hydrophilic layer. Alternatively, to form the relatively hydrophilic layer, a relatively hydrophilic substance may be sprinkled or applied over the substrate in addition to as an option in lieu of relying on the ground relatively hydrophilic dust settled on the ground side of the substrate. The use of a grinding step with precisely controlled thickness can improve the thickness uniformity of the diffusion media resulting in improved sheet-to-sheet and within-sheet thickness uniformity; it is known that thickness variation of state-of-the-art diffusion media is a troublesome issue since the current production processes do not allow for tight thickness control.

As explained above, the vacuum draw may contain rows of air holes that are spaced apart a specific distance according to a predetermined pattern. The pattern can be used to define distinct active areas of the diffusion media. As explained above, the inlet region of the fuel cell has different requirements than the outlet region of the fuel cell. The pattern of air holes can be tailored to account for these differences.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A porous diffusion media comprising a porous matrix carrying a distribution of water transfer particles, wherein:
    said diffusion media defines a major planar dimension and first and second major faces substantially parallel to said major planar dimension of said diffusion media;
    said distribution of water transfer particles defines a plurality of high particle density regions characterized by a relatively high density of said water transfer particles and a plurality of low particle density regions characterized by a relatively low density of said water transfer particles;
    said relatively high and relatively low particle density regions alternate across said major planar dimension of said porous diffusion media;
    respective properties of said relatively high and relatively low particle density regions vary across a cross section of said porous diffusion media between said first and second major faces of said diffusion media such that said first major face is collectively more hydrophilic than said second major face and said second major face is collectively more hydrophobic than said first major face, wherein the first major face and the second major face each comprise hydrophilic and hydrophobic portions; and
    said porous diffusion media further comprises a layer of hydrophobic material disposed along one of said first or second major faces of said diffusion media.

2. A porous diffusion media as claimed in claim 1 wherein said water transfer particles are selected from carbon, graphite, non-perfluorinated polymers, metal oxides, and combinations thereof.

3. A porous diffusion media as claimed in claim 2 wherein said non-perfluorinated polymers comprise polyvinylidine fluoride (PVDF) and said metal oxides comprise silicon dioxide.

4. A porous diffusion media as claimed in claim 1 wherein said water transfer particles comprise a carbon/polymer composite.

5. A porous diffusion media as claimed in claim 1 wherein said water transfer particles are selected from carbon fibers or powders, graphite fibers or powders, and combinations thereof.

6. A porous diffusion media as claimed in claim 1 wherein said water transfer particles comprise a material forming said porous matrix.

7. A porous diffusion media as claimed in claim 6 wherein said porous matrix comprises carbon paper and said water transfer particles comprise carbon fibers or powders.

8. A porous diffusion media as claimed in claim 6 wherein said porous matrix comprises carbon paper and a layer of hydrophobic material and said water transfer particles comprise carbon fibers or powders.

9. A porous diffusion media as claimed in claim 1 wherein said water transfer particles are distributed across a cross section of said porous diffusion media between said first and second major faces of said diffusion media.

10. A porous diffusion media as claimed in claim 1 wherein said relatively high and relatively low particle density regions alternate across at least one of said first and second major faces of said diffusion media.

11. A porous diffusion media as claimed in claim 10 wherein said alternating density regions are characterized by a periodicity of less than about 1 cm.

12. A porous diffusion media as claimed in claim 1 wherein said relatively high and relatively low particle density regions alternate across said first and second major faces of said diffusion media.

13. A porous diffusion media as claimed in claim 1 wherein respective cross-sectional dimensions of said relatively high and relatively low particle density regions vary inversely across a cross section of said porous diffusion media between said first and second major faces of said diffusion media.

14. A porous diffusion media as claimed in claim 13 wherein said respective cross-sectional dimensions of said relatively high and relatively low particle density regions vary such that one of said major faces is dominated by said relatively high particle density regions while the other of said major faces is dominated by said relatively low particle density regions.

15. A porous diffusion media as claimed in claim 1 wherein a density value of said relatively high particle density regions remains substantially uniform from one high particle density region to the next across one of said first and second major faces of said diffusion media.

16. A porous diffusion media as claimed in claim 1 wherein a density value of said relatively high particle density regions varies from one high particle density region to another high particle density region across one of said first and second major faces of said diffusion media.

17. A porous diffusion media as claimed in claim 16 wherein said variation in said density value defines a profile that increases from a flow field inlet region of said diffusion media to a flow field outlet region of said flow field.

18. A porous diffusion media as claimed in claim 1 wherein said porous matrix defines a substantially uniform porosity profile across said major planar dimension.

19. A porous diffusion media as claimed in claim 1 wherein said porous matrix comprises an electrically conductive material selected from carbon paper, graphite paper, cloth, felt, foam, carbon or graphite wovens, carbon or graphite non-wovens, metallic screens or foams, and combinations thereof.

20. A porous diffusion media as claimed in claim 1 wherein said porous matrix defines a thickness of between about 20 µm and about 1000 µm.

21. A porous diffusion media as claimed in claim 1 wherein said porous matrix defines a thickness of about 200 µm.

22. A porous diffusion media as claimed in claim 1 wherein said porous matrix defines a porosity characterized by a permeometer number of about 50 ft$^3$/min./ft$^2$ at about 0.5 inches of water.

23. A porous diffusion media as claimed in claim 1 wherein said porous matrix defines a porosity characterized by a Gurley permeometer number of between about 20 ft$^3$/min./ft$^2$ and about 100 ft$^3$/min./ft$^2$ at about 0.5 inches of water.

24. A porous diffusion media as claimed in claim 1 wherein said porous diffusion media further comprises a binder configured to at least partially secure said water transfer particles to said porous matrix.

25. A porous diffusion media as claimed in claim 24 wherein said binder comprises a fluoropolymer.

26. A porous diffusion media as claimed in claim 1 wherein said hydrophobic layer has a thickness of up to about 125 µm.

27. A porous diffusion media as claimed in claim 1 wherein said layer of hydrophobic material disposed along one of said first and second major faces is characterized by a loading of up to about 5 mg per cm$^2$ of diffusion media surface area.

28. A porous diffusion media as claimed in claim 1 wherein said layer of hydrophobic material is configured such that it is more repellent to water droplets than said relatively high and relatively low particle density regions of said porous diffusion media.

29. A porous diffusion media as claimed in claim 1 wherein said layer of hydrophobic material comprises one of carbon, graphite, a fluoropolymer, a polymer, and combinations thereof.

30. A porous diffusion media as claimed in claim 29 wherein said hydrophobic material comprises a fluoropolymer produced from one of polytetrafluoroethylene (PTFE), tetrafluoroethylene (TFE), ethylenetetrafluoroethylene (ETFE), fluorinated ethylenepropylene (FEP), a perfluoroalkoxy compound, and combinations thereof.

31. A porous diffusion media as claimed in claim 29 wherein said hydrophobic material comprises a polymer selected from polyphenylene, polyvinylidine fluoride (PVDF), and combinations thereof.

32. A porous diffusion media as claimed in claim 1 wherein said water transfer particles are characterized by dimensions sufficiently small enough to permit migration of said water transfer particles through a thickness dimension of said porous matrix defined between said first and second major faces of said diffusion media.

33. A device comprising a porous diffusion media positioned against a catalyst layer, wherein:
    said diffusion media defines a major planar dimension and first and second major faces substantially parallel to said major planar dimension of said diffusion media;
    said porous diffusion media comprises a porous matrix carrying a distribution of water transfer particles;
    said distribution of water transfer particles defines a plurality of high particle density regions characterized by a relatively high density of said water transfer particles and a plurality of low particle density regions characterized by a relatively low density of said water transfer particles;
    said relatively high and relatively low particle density regions alternate across said major planar dimension of said porous diffusion media;
    respective properties of said relatively high and relatively low particle density regions vary across a cross section of said porous diffusion media between said first and second major faces of said diffusion media such that said first major face is collectively more hydrophilic than said second major face and said second major face is collectively more hydrophobic than said first major face, wherein the first major face and the second major face each comprise hydrophilic and hydrophobic portions; and
    said diffusion media is positioned against said catalyst layer along said first major face of said diffusion media.

34. A device as claimed in claim 33 wherein respective cross-sectional dimensions of said relatively high and relatively low particle density regions vary inversely across a cross section of said porous diffusion media between said first and second major faces of said diffusion media such that said first major face is characterized by high particle density regions of relatively large cross sectional dimensions and said second major face is characterized by high particle density regions of relatively small cross sectional dimensions.

35. A device as claimed in claim 34 wherein said diffusion media is positioned against said catalyst layer along said first major face of said diffusion media.

36. A device as claimed in claim 33 wherein said porous diffusion media comprises hydrophobic material disposed along said second major face of said diffusion media.

37. A device as claimed in claim 33 wherein said device further comprises additional structure defining, in combination with said catalyst layer and said porous diffusion media, a membrane electrode assembly interposed between an anode flow field and a cathode flow field.

38. A device as claimed in claim 37 wherein said device further comprises additional structure defining, in combination with said membrane electrode assembly, said anode flow field, and said cathode flow field, a fuel cell.

39. A device as claimed in claim 38 wherein said water transfer particles are characterized by migrational freedom sufficient to permit transfer of said water transfer particles to a surface of said catalyst layer during operation of said fuel cell.

40. A device as claimed in claim 39 wherein said fuel cell defines a motive power source of said vehicle.

41. A device as claimed in claim 38 wherein said device further comprises additional structure defining, in combination with said fuel cell, a vehicle.

42. A device comprising a membrane electrode assembly interposed between an anode flow field and a cathode flow field of a fuel cell, wherein:
    a porous diffusion media is positioned against a catalyst layer of said membrane electrode assembly;
    said porous diffusion media comprises a porous matrix carrying a distribution of water transfer particles;
    said porous matrix comprises carbon paper and said water transfer particles comprise carbon fibers or powders;
    said distribution of water transfer particles defines a plurality of high particle density regions characterized by a relatively high density of said water transfer particles and a plurality of low particle density regions characterized by a relatively low density of said water transfer particles;

said relatively high and relatively low particle density regions alternate across a major planar dimension of said porous diffusion media parallel to first and second major faces of said diffusion media;

respective properties of said relatively high and relatively low particle density regions vary across a cross section of said porous diffusion media between said first and second major faces of said diffusion media such that said first major face is collectively more hydrophilic than said second major face and said second major face is collectively more hydrophobic than said first major face, wherein the first major face and the second major face each comprise hydrophilic and hydrophobic portions;

said diffusion media is positioned against said catalyst layer along said first major face of said diffusion media;

said diffusion media is positioned against a flow field of said fuel cell along said second major face of said diffusion media;

said porous diffusion media comprises hydrophobic material disposed along said second major face of said diffusion media; and said hydrophobic material comprises polytetrafluoroethylene (PTFE).

\* \* \* \* \*